Feb. 11, 1941. M. J. DE MASK 2,231,056
ELECTRICAL CONDUIT
Filed June 13, 1938 3 Sheets-Sheet 1

INVENTOR
Martin J. DeMask
by R. V. Craddock
ATTORNEY

Feb. 11, 1941.  M. J. DE MASK  2,231,056
ELECTRICAL CONDUIT
Filed June 13, 1938  3 Sheets-Sheet 2
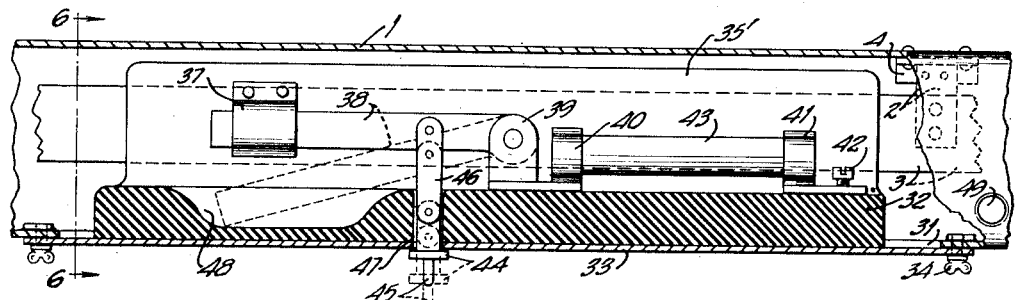
FIG.5
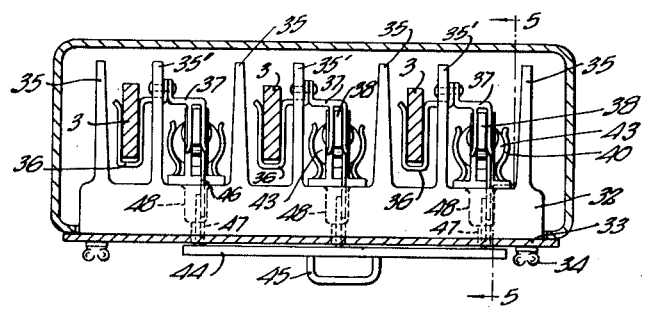
FIG.6
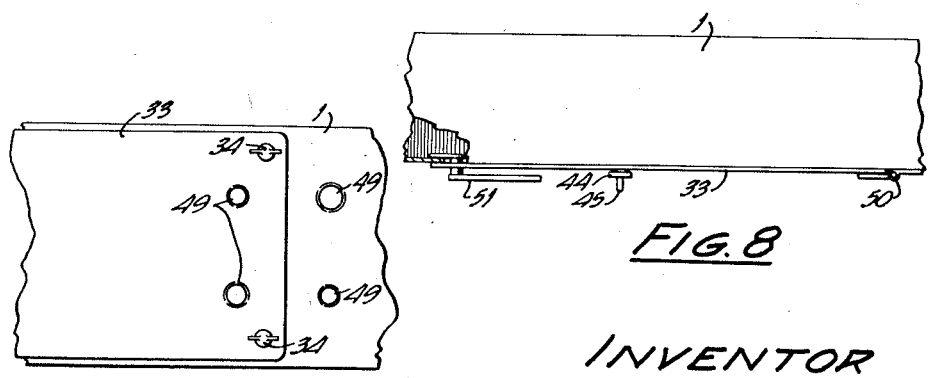
FIG.7
FIG.8
INVENTOR
Martin J. DeMask
by R. V. Craddock
ATTORNEY Feb. 11, 1941.    M. J. DE MASK    2,231,056
ELECTRICAL CONDUIT
Filed June 13, 1938    3 Sheets-Sheet 3
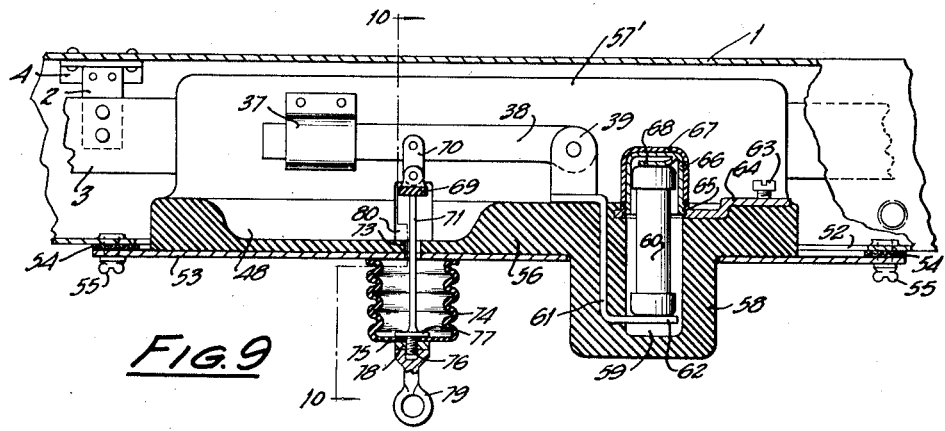
Fig.9
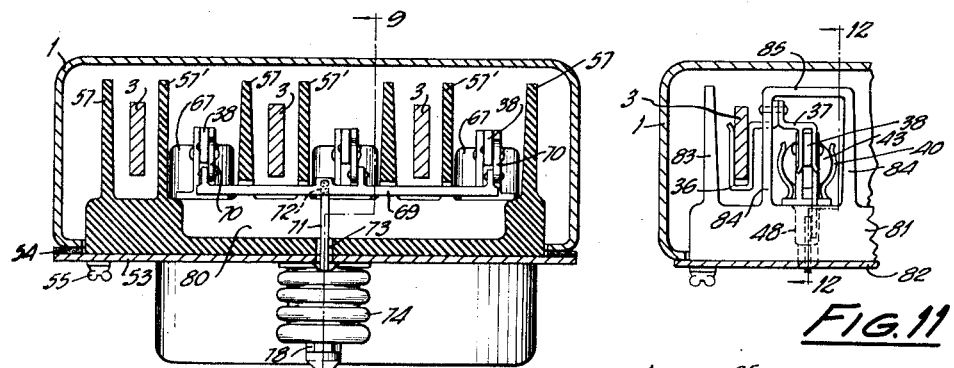
Fig.10    Fig.11
Fig.12
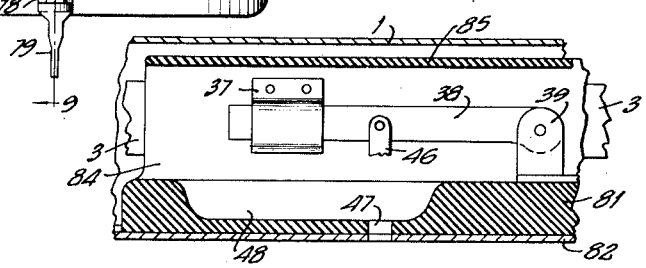
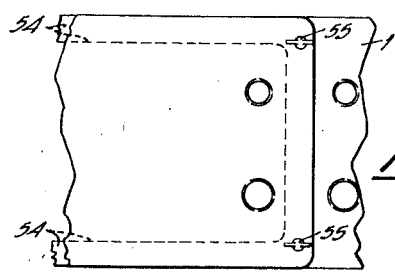
Fig.13
INVENTOR
Martin J. DeMask
by R.V. Craddock
ATTORNEY Patented Feb. 11, 1941

2,231,056

UNITED STATES PATENT OFFICE 2,231,056

ELECTRICAL CONDUIT

Martin J. De Mask, Pittsfield, Mass.

Application June 13, 1938, Serial No. 213,396

24 Claims. (Cl. 175—307)

My invention relates to conduits provided with electrical conductors or bus bars extending longitudinally thereof and particularly to contact elements which may be electrically connected to said conductors and which contact elements are adapted to be engaged by switch blades whereby electrically to connect said blades with said conductors.

Conduits of the character herein contemplated are adapted to be employed for electrical power transmission in buildings, factories and similar places and it is common practice to provide said conduits at suitable points therealong with means whereby power distribution lines may be electrically connected to the conductors within the duct. Electrical connections, for example, are made with the conductors or bus bars of the conduits by means of plug or switch blades which are designed to be inserted within the conduit and engage the bus bars. However, where electrical connections are made in this manner and the blades directly engage the bus bars, corrosion and pitting of the bars result because, when the switch blades are moved to disengage the bus bars, arcing is very apt to occur.

It is, therefore, an object of my invention to provide contact elements which are adapted to be engaged by the switch blades of a power take-off unit which contact elements, in turn, are electrically connected to the respective bus bars and said contact elements being so arranged that they may be disposed in electrical engagement with the respective bus bars without any attendant danger to the person so positioning the same while the bus bars are alive or, in other words, while the bus bars remain connected to the power supply.

A further object resides in the provision of electrical insulating barriers which are arranged to lie between the respective bus bars in those zones where the switch blades engage the contact elements and another object lies in providing a barrier arranged to lie between a bus bar and that portion of a contact element which is electrically connected therewith and which is adapted to be engaged by a switch blade.

In arranging the conduit for power take-off purposes, it is desirable to provide but one opening in the zone of said conduit in which electrical connection is to be made with the bus bars therein. It is, therefore, a further object of my invention to provide contact elements arranged respectively to engage the bus bars and insulating barriers arranged to extend between the bus bars, said contact elements and barriers being supported on a closure element for the opening in the conduit. A further object resides in providing, in a power take-off unit, a closure element of the foregoing character comprising switch blades which are movable relative to the said closure element and adapted, when the closure element is secured to said conduit, to be actuated to make and break electrical connections with said contact elements. A still further object resides in providing, in a power take-off unit, a closure element of the character last above described which is primarily designed to effect a vapor-proof closure of the opening in the conduit while permitting operation of the switch blades disposed within said conduit.

With these and other objects in view, my invention includes the novel elements and the combinations and arrangements thereof described below and illustrated in the accompanying drawings, in which—

Fig. 5 is a fragmentary, side elevation view of a conduit, partially broken away and taken in about the plane 5—5 of Fig. 6;

Fig. 6 is a sectional view of the conduit of Fig. 5 taken in about the plane 6—6 thereof;

Fig. 7 is a fragmentary, bottom plan view of the conduit of Fig. 5;

Fig. 8 is a fragmentary side elevation view of the conduit of Fig. 5 but illustrating a hinged connection between the conduit and the closure element therefor;

Fig. 9 is a fragmentary, side elevation view of a conduit, partially broken away and taken in about the plane 9—9 of Fig. 10 and illustrating a modified construction;

Fig. 10 is a transverse, sectional view of the conduit of Fig. 9 taken in about the plane 10—10 thereof;

Fig. 11 is a fragmentary, transverse section of a conduit illustrating a further modified construction;

Fig. 12 is a fragmentary, sectional view taken in about the plane 12—12 of Fig. 11; and Fig. 13 is a fragmentary bottom plan view of the conduit of Fig. 9.

Figure 1:
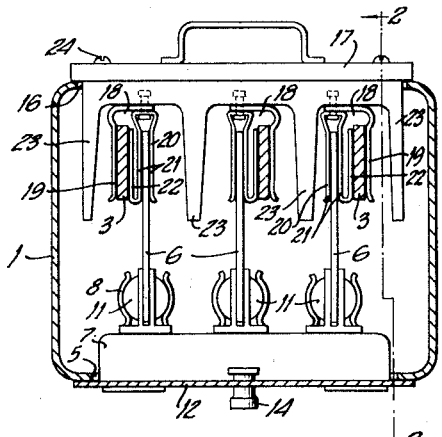
Fig. 1 is a sectional view of a conduit taken transversely thereof in about the plane 1—1 of Fig. 2 and illustrating one embodiment of my invention.

Referring to the drawings and particularly to Figs. 1 to 4, 1 indicates a conduit or duct which is preferably formed of metal and may be provided in sections which are adapted to be affixed in aligned relation to a suitable supporting structure. The duct 1 may be of any desired configuration and suitable hangers, as indicated at 2 by way of example, may be provided and arranged at spaced intervals along the duct for supporting bus bars or conductors 3. The hangers 2 may be secured to insulators 4 which in turn are suitably secured to the top of the duct and the bus bars 3 may be bolted to the hangers 2 or secured thereto in any desired manner. For purposes of illustration, I have shown three bus bars which are arranged to extend longitudinally of the duct in spaced relationship. At suitable intervals, where it is desired electrically to connect distribution lines with the bus bars, the conduit 1 is provided with openings such as the opening indicated at 5 through which the contact blades of a switch or plug or power take-off unit may be inserted into the duct to effect an electrical connection between the distribution lines and the bus bars. The switch or plug elements may be of any desired construction and, in the drawings, are illustrated as comprising upstanding blades 6 which are secured to a base 7 of an electrical insulating material and electrically connected, respectively, to one clip 8 of a pair of fuse clips. The other fuse clip 9, in each instance, is also mounted upon the insulating base 7 and is electrically connected to a terminal 10 to which power distribution or take-off leads are adapted to be connected. Fuses 11 are retained in position by the fuse clips 8 and 9 and serve to complete the electrical circuit between each switch blade and its associated terminal. The insulating base 7 is suitably secured to a plate 12 preferably secured at one end to the conduit 1 as indicated at 13 and provided adjacent the opposite end thereof with a lever or latch 14 which is adapted to engage the base of the conduit adjacent the opening 5 therein and retain plate 12 in position over said opening. The plate 12 and the conduit may be provided with knockouts 15 which are adapted to permit the use either of flexible or rigid conduit in connection with the power take-off lines.

Figure 2:
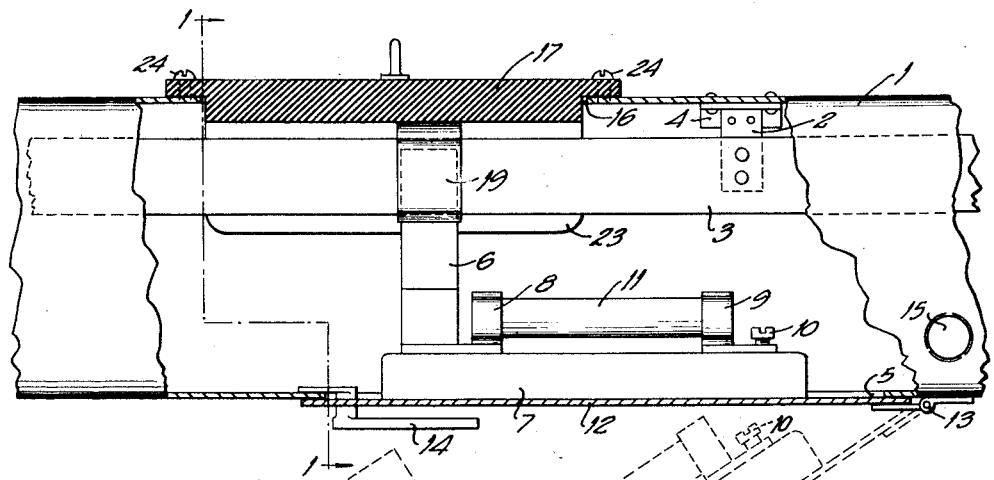
Fig. 2 is a fragmentary side elevation view of a conduit, partially broken away and taken in about the plane 2—2 of Fig. 1.
Figure 4:
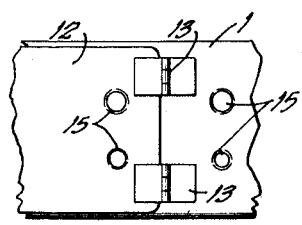
Fig. 4 is a fragmentary, bottom plan view of a conduit and associated closure element.

Obviously, when the plate 12 is swung to open position as illustrated in dotted lines in Fig. 2 the blades 6 are electrically disconnected from the bus bars but when said plate is swung to closed position an electrical circuit between the bus bars and the power distribution or take-off lines, which may be connected to terminals 10, is made.

As hereinbefore indicated, it is desirable to provide a power take-off unit of the foregoing character comprising contact elements including portions which are adapted to engage the bus bars and other portions which may be engaged by the switch blades of the power take-off unit. I have, therefore, provided the conduit 1 with an opening 16 in the top thereof within which a plate element 17 of electrical insulating material is adapted to be placed. Upon the element 17 is supported contact elements, indicated generally at 18, which comprise, in the embodiment illustrated in Fig. 1, strips 19 and 20 of electrical conducting, preferably resilient, material. The strip 20 is bent to provide downwardly extending, parallelly spaced legs 21 which form spaced jaws or a clip adapted to be engaged by the blade 6, one of said legs being somewhat longer than the other and bent back upon itself to provide the leg 22 which is adapted co-operatively with the downwardly extending leg of strip 19 to form a similar clip designed to engage the bus bar 3. The two strips 19 and 20 may be riveted or otherwise suitably secured to the insulating plate element 17 and in such position relative thereto that, when said element 17 is properly placed within the opening 16 of the conduit, the bus bars 3 will be engaged by the contact elements 18 and the legs 21 thereof will be properly positioned to be engaged by the blades of the power take-off unit. If desired, strip 19 may be omitted and the reversely bent leg 22 of strip 20 alone used to make electrical contact with the bus bars.

The insulating element 17 is also preferably provided with barriers 23 which are arranged to lie between the bus bars and associated contact elements. The barriers 23 are designed to prevent the occurrence of arcing between conducting elements of opposite polarity and said barrier elements preferably extend slightly below the contact elements and longitudinally of the duct at least in the zone in which the contact blades engage the contact elements. The element 17 may be secured in position by suitable means such as by screws indicated at 24 whereby to prevent relative movement between the contact elements carried thereby and associated bus bars when the blades 6, for example, are moved to engage said contact elements.

In those cases where low voltages are employed, the barriers 23 may, if desired, be omitted and the jaws 21 of the contact elements may be spaced an appreciable distance from the bus bars so that the air space therebetween is sufficiently great to prevent arcing.

Figure 3:
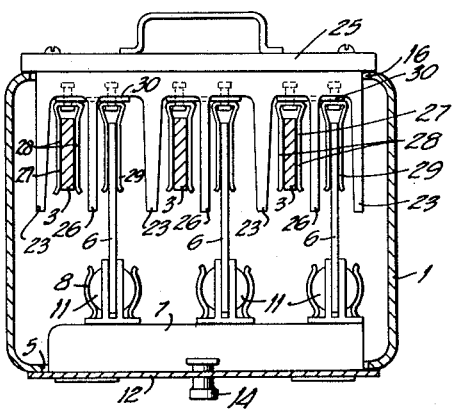
Fig. 3 is a view similar to Fig. 2 showing a slightly modified construction.

In Fig. 3, I have illustrated a slightly modified form of my invention wherein insulating barriers are interposed between each bus bar and those portions of its associated contact element which are designed to be engaged with the blades of the power take-off unit. The electrically insulating plate element 25 is similar to element 17 but is provided with additional barriers 26 which lie between the barriers 23 and preferably are substantially coextensive therewith. In this embodiment of my invention, the contact elements may comprise a first strip of electrical conducting, preferably resilient material 27 which is bent to provide the parallelly spaced jaws 28 adapted to engage the bus bar 3. A second strip 29 of electrical conducting, preferably resilient material is formed to provide jaws, similar to jaws 28, which are adapted to be engaged by the blade 6 of the power take-off unit. The strips 27 and 29 are arranged between adjacent barriers 23 and on opposite sides of the barrier 26 and are suitably secured to the element 25 and electrically connected together as, for example, by means of an electrical conducting strip 30 which engages the respective strips 27 and 29 and passes through the barrier 26.

It will be seen that by means of this latter construction, the possibility of arcing between the blades of the power take-off unit and the bus bars is entirely precluded. It will also be noted that by providing elements of the character of elements 17 and 25 which carry contact elements as described that connections may be made to the bus bars within the conduits without any attendant danger to the person making such connections and without any necessity of disconnecting the bus bars from the source of electrical energy In Figs. 5 to 8, I have illustrated a modified form of my invention wherein the contact elements, insulating barriers and switch mechanisms are all mounted upon a common base plate. This, of course, obviates any necessity of providing more than one opening in the conduit when it is desired to make electrical connection with the bus bars therein.

Furthermore, in the embodiment illustrated, I have so arranged the respective elements of the power take-off unit that they may lie entirely within the duct or conduit whereby the continuity of the exterior configuration of the duct is substantially uninterrupted. The duct 1 is provided with an opening 31 in the base thereof through which the power take-off unit is adapted to be inserted within the conduit. A base 32 of electrical insulating material provided with upstanding barriers 35 similar to those above described is mounted upon a plate 33 which is adapted to be secured as by means of set screws 34 to the conduit to effect a closure of the opening therein. The base 32 is also provided with upstanding barriers 35' which are preferably arranged to lie between the respective bus bars 3 and those portions of the contact elements which are designed to be engaged by the switch blades of the power take-off unit when said unit is secured in operative position on the conduit. The contact elements comprise a first clip 36 which is designed to engage the bus bars 3 when the unit is inserted within the conduit and a second clip 37 which is adapted to be engaged by a switch blade 38. The clip 36 in part extends through the adjacent barrier 35' and is secured thereto and in electrical contact with the second clip 37. As illustrated in Fig. 5, each of the switch blades 38 is pivotally mounted in a bracket 39 electrically connected to a fuse clip 40 and a second fuse clip 41, in each case, is electrically connected with a terminal 42 to which a power take-off line may be connected. A fuse or other automatic, circuit breaking device is illustrated at 43.

It will be noted that with the construction, above pointed out, the bus bars 3 and associated clips 36 are entirely shielded by the baffles 35 from the clips 37, switch blades 38 and their associated conducting parts.

For purposes of operating the switch blades, a bar 44 comprising a handle 45 is provided, said bar extending generally transversely of the conduit and being connected by means of links 46 to the respective switch blades 38. The links 46 extend through openings 47 in the insulating base and base plate 33. The insulating base 32 is also preferably provided with depressions 48 which permit sufficient movement of the respective switch blades after contact with the contact elements has been broken to prevent arcing therebetween.

It will be evident that the foregoing arrangement permits a compact assembly of conduit and power take-off unit and, at the same time, the switch blades may be operated to make or break a circuit to the bus bars without the necessity of moving the unit as a whole relative to the conduit.

The base plate 33 and the conduit may be provided with knock-outs 49 to permit take-off leads to be connected with the terminals 42 of the power take-off unit, as hereinbefore described, and, as illustrated in Fig. 8, the plate 33 may be hingedly connected to the conduit 1 as at 50 and provided with a latch 51 whereby the unit may be swung from within the conduit for examination or repair purposes.

Of course, the contact areas shown in Fig. 6 may be mounted in substantially the same manner as shown in Fig. 3, that is, they may be supported on the surfaces of base element 32 between the barriers thereof rather than on the barriers. Hence, it will be understood that the term base member as herein employed is intended to denote the barriers as well as those portions between and connecting said barriers upon which the contact elements may be supported as illustrated in the drawings.

In Figs. 9, 10 and 13, I have illustrated a modified form of my invention somewhat similar to that last above described but which is primarily designed for vapor-proof installations. The duct is provided with an opening 52 in the base thereof through which a power take-up unit is adapted to be inserted within the duct. The base plate 53 of the unit is adapted to overlie the marginal portions of the opening 52 and a gasket 54 is interposed therebetween to effect a vapor-proof closure of said opening. Set screws 55 may be employed for securing the plate 53 in position over the opening. A base 56 of electrical insulating material is provided with barriers 57 and 57', similar to barriers 35 and 35', and contact elements and switch blades similar to those described with reference to Figs. 5 and 6. However, the base 56 is preferably provided with a downwardly extending portion 58 provided with a well 59 adapted to permit the insertion of a fuse 60 therein. A conductor 61 which may be molded in the base 56 is electrically connected with the bracket 39 of the switch blade 38 and is provided with a preferably resilient lip 62 disposed adjacent the bottom of the well 59. A terminal screw 63 serves electrically to connect a power take-off lead with a conductor 64 which may be molded in the insulating base 56. Conductor 64 is provided with an opening therein, aligned with the well 59 at the top thereof and interiorly threaded as indicated at 65 whereby the exteriorly threaded end of the electrical conducting insert 66 of an insulating cap 67 may be threaded therein. The insert 66 may be provided with a struck down lip 68 which is adapted to engage one end of the fuse 60 and complete a circuit between the switch blades and power-take-off terminals.

With the above construction, a power take-off unit of comparatively short length may be provided which does not extend longitudinally of the conduit to such an extent as those hereinbefore described and, of course, a considerable saving may be effected in the amount of electrical insulating material employed in the fabrication of the insulating base and barriers.

To permit operation of the switch blades while preserving the vapor-proof character of the system, I have provided a bar 69 which is arranged to lie generally transversely of and within the duct and to which the respective switch blades are connected by means of links 70. A rod 71 which may be threaded into the bar 69 as illustrated at 72 in Fig. 10 extends downwardly therefrom and through an opening 73 in the insulating base 56 and base plate 53. A distensible envelope or diaphragm 74 which may be of rubber or other suitable material and corrugated as illustrated, is cemented to the base plate 53 and about the opening 73 therein. The lower end of diaphragm 74 may be provided with an opening 75 through which the threaded end 76 of the rod 71 extends. Rod 71, adjacent the threaded end thereof, is preferably provided with a boss or shoulder 77 so that, when a nut 78 is threaded on the end of rod 71 it will serve to compress the diaphragm against the shoulder 77 and thereby prevent the entrance of air or vapor within the diaphragm 74 and, of course, within the conduit 1. An operating handle 79 may also be threaded on the end of rod 71 to lock the nut 78 thereon.

With the vapor-proof construction above described, power take-off lines may be electrically connected with and disconnected from the bus bars within the conduit without impairing in any way the desired, vapor-proof character of the system.

In order to permit vertical movement of the transverse bar 69 when the switch blades 38 are operated, the insulating base 56 is provided with a groove 80 extending transversely thereof and beneath some of the baffles whereby the bar 69 may be positioned therein and moved in a generally vertical direction to operate the switch blades 38. By connecting the blades to a common operating lever in this manner, it is only necessary to provide a single opening through which connection is made between the operating bar and an exteriorly disposed operating lever or handle. Obviously, the switch blades may be connected to a common, operating handle exteriorly of the conduit or even separately or independently operated but, in order to preserve a vapor-proof construction, it would then be necessary to provide an envelope or similar vapor-proof construction about that portion of each blade-operating link which extends exteriorly of the conduit.

Fig. 13 illustrates the base plate 53 secured to the conduit 1 with a gasket 54 disposed therebetween for vapor-proof purposes as one manner in which the take-off unit may be secured in position. Obviously, the plate 53 may be hinged to the conduit 1 as hereinbefore described to effect a vapor-proof closure of the opening therein by providing a gasket in the manner herein disclosed.

In Figs. 11 and 12, I have illustrated a further modification of my invention wherein the electrical insulating base 81 which is mounted on a base plate 82 is provided with upstanding barriers 83 and 84, the barriers 84 lying on opposite sides of the switch blades and comprising a substantially horizontally disposed barrier 85 which may be formed integrally therewith to form an insulating enclosure extending about the switch blades and associated contact elements. As illustrated in Fig. 12, the barrier 85 need merely to overlie the switch blades or at least extend above the zone wherein the switch blades engage the contact elements.

From the foregoing, it should be evident that I have provided a power take-off unit which, in the various embodiments of my invention herein illustrated and described, may be inserted within a conduit whereby to effect an electrical connection between the bus bars in said conduit and power distribution lines without requiring a power shut-off to the bus bars. Changes or variations, therefore, in installations may be made without affecting in any way operations which depend upon continued power supply to the bus bars in the conduit and this may be accomplished without any attendant danger to the person making such changes. Furthermore, the provision of contact elements and barriers in the manners herein set forth insure longer life of the bus bars due to the absence of pitting or corrosion in those points therealong where switch connections are made thereto because arcing thereto is entirely prevented.

It is to be understood that the barrier elements, hereinbefore described, are arranged to extend longitudinally of the conduit and to lie at least in those zones where the switch blades engage the clips for electrical connection with the bus bars and, in the embodiment of my invention wherein the fuses are arranged to lie substantially between the bus bars, I prefer to extend the barriers so as to completely shield the bus bars from the current carrying portions of the power take-off unit.

Furthermore, it is to be understood that though I have referred to the contact elements as comprising spaced jaws or clips which are adapted to be engaged by the blades of the power take-off unit, said blades may be provided with bifurcated ends which may be moved to engage a depending lip or blade portion which the contact elements may comprise. However, in both instances, the contact elements comprise a contact surface which is adapted to be engaged by a switch blade and effect an electrical connection thereof with a bus bar in the manner hereinbefore described.

Hence, while I have described my invention in its preferred embodiments, it is to be understood that the words which I have used are words of description and not of limitation and that changes within the purview of the appended claims may be made without departing from the true scope and spirit of my invention in its broader aspects.

What I claim is:

1. In a device of the character described, a duct provided with an aperture therein, a plurality of spaced bus bars supported within said duct and electrically insulated therefrom and a power take-off unit adapted to be inserted through said aperture into said duct and in operative relation to said bus bars; said unit comprising a movably mounted switch blade and contact means so constructed and arranged as to directly contact a bus bar when said unit is placed in operative relation thereto, said contact means including a contact area positioned between said bus bars and adapted frictionally to engage said switch blade when said blade is actuated, and an insuating barrier on said unit disposed to lie between the contact area of said contact means and said bus bar when said unit is inserted in said duct.

2. In a device of the character described, a duct provided with an aperture therein, a plurality of spaced bus bars supported within said duct and electrically insulated therefrom and a power take-off unit adapted to be inserted through said aperture into said duct and in operative relation to said bus bars; said unit comprising a movably mounted switch blade and contact means so constructed and arranged as to directly contact a bus bar when said unit is placed in operative relation thereto, said contact means including a contact area between said bus bars and adapted frictionally to engage said switch blade when said blade is actuated, and an insulating barrier on said unit disposed to lie on both sides of said switch blade and between said bus bars and above said switch blade.

3. In a device of the character described, a duct provided with an aperture therein, a plurality of spaced bus bars supported within said duct and electrically insulated therefrom and a power take-off unit adapted to be inserted through said aperture into said duct and in operative relation to said bus bars; said unit comprising a movably mounted switch blade and contact means so constructed and arranged as to directly contact a bus bar when said unit is placed in operative relation thereto, said contact means including a contact area positioned between said bus bars and adapted frictionally to engage said switch blade when said blade is actuated, and barrier means on said unit extending above said switch blade and on both sides of said switch blade and between said bus bars and between the contact area of said contact means and said bus bar when said unit is inserted in said duct.

4. In apparatus of the character described, a duct, a plurality of elongated bus bars mounted in spaced relation within said duct, one wall of said duct being provided with an opening, an insulating base disposed at said opening, and contact means mounted on said insulating base, said contact means including electrically connected contact areas which are moved into operative position within said duct when said insulating base is disposed at said opening, one of said contact areas being in direct contact with one of said bus bars and another of said contact areas being out of direct contact with said bus bars and positioned between said bus bars for frictional contact by a contact blade.

5. In a device of the character described, a duct, a plurality of elongated bus bars mounted in spaced relation within said duct, one wall of said duct being provided with an opening, an insulating base disposed at said opening, contact means mounted on said insulating base, said contact means including electrically connected contact areas which are moved into operative position within said duct when said insulating base is disposed at said opening, one of said contact areas being in direct contact with one of said bus bars and another of said contact areas being out of direct contact with said bus bars and spaced from said first-mentioned contact area and positioned between said bus bars for frictional contact by a contact blade, and an insulating barrier on said insulating base extending between said first-mentioned contact area and said second-mentioned contact area.

6. In a device of the character described, a duct, a plurality of elongated bus bars mounted in spaced relation within said duct, one wall of said duct being provided with an opening, an insulating base disposed at said opening, contact means mounted on said insulating base, said contact means including electrically connected contact areas which are moved into operative position within said duct when said insulating base is disposed at said opening, one of said contact areas being in direct contact with one of said bus bars and another of said contact areas being out of direct contact with said bus bars and positioned between said bus bars for frictional contact by a contact blade, and insulating barriers on said insulating base, one of said insulating barriers extending between said first-mentioned contact area and said second-mentioned contact area and another of said insulating barriers extending between said second-mentioned contact area and an adjacent bus bar.

7. In a device of the character described, a duct, a plurality of elongated bus bars mounted in spaced relation within said duct, one wall of said duct being provided with an opening, an insulating base disposed at said opening, and contact means mounted on said insulating base, said contact means including electrically connected contact areas which are moved into operative position within said duct when said insulating base is disposed at said opening, one of said contact areas being in direct contact with one of said bus bars and another of said contact areas being out of direct contact with said bus bars and positioned between said bus bars for frictional contact by a contact blade, and a contact blade mounted on said insulating base for frictional contact with said second-mentioned contact area.

8. In a device of the character described, a duct, a plurality of elongated bus bars mounted in spaced relation within said duct, one wall of said duct being provided with an opening, a base member disposed at said opening, and a switch blade mounted on said base member for electrical connection with and disconnection from one of said bus bars, said switch blade extending substantially lengthwise of said bus bars and between said bus bars when electrically connected to one of said bus bars.

9. In a device of the character described, a duct, a plurality of elongated bus bars mounted in spaced relation within said duct, one wall of said duct being provided with an opening, an insulating base disposed at said opening, switch blades mounted on said insulating base for electrical connection with and disconnection from said bus bars, one of said switch blades extending substantially lengthwise of said bus bars and between said bus bars when electrically connected to one of said bus bars and another switch blade extending substantially lengthwise of one of said bus bars and between said last-mentioned bus bar and an adjacent side of said duct when electrically connected to said last-mentioned bus bar.

10. In a device of the character described, a duct, one wall of said duct being provided with an opening, a plurality of elongated bus bars mounted in spaced relation within said duct, an insulating base disposed at said opening, a switch blade mounted on said insulating base for electrical connection with and disconnection from one of said bus bars, and a fuse mounted on said insulating base and electrically connected to said switch blade, said switch blade and said fuse extending substantially lengthwise of said bus bars and between said bus bars when said switch blade is electrically connected to one of said bus bars.

11. In a device of the character described, a duct, a plurality of elongated bus bars mounted in spaced relation within said duct, one wall of said duct being provided with an opening, an insulating base disposed at said opening, an insulating barrier on said insulating base, said barrier extending between adjacent bus bars when said insulating base is disposed at said opening, contact members mounted on said insulating barrier, one of said contact members being in direct contact with one of said bus bars and another of said contact members being out of direct contact with said bus bars and mounted on the opposite side of said insulating barrier from said first-mentioned contact member and positioned for frictional contact by a switch blade, and a switch blade mounted on said insulating base for contact with said second-mentioned contact member.

12. In a device of the character described, a duct, a plurality of elongated bus bars extending lengthwise of and in spaced relation within said duct, one wall of said duct being provided with an opening, an insulating base disposed substantially completely within said duct at said opening, contact means mounted on said insulating base, said contact means including contact areas, one of said contact areas being in direct contact with one of said bus bars and another of said contact areas being out of direct contact with said bus bars and positioned for contact by a contact blade, and a contact blade movably mounted on said insulating base for contact with said second-mentioned contact area, said contact blade extending substantially lengthwise of said bus bars and between said bus bars when in contact with said second-mentioned contact area.

13. In a bus-duct electrical distribution system, a bus-duct provided with an aperture therein, a plurality of elongated spaced bus bars extending lengthwise of, and within, said bus-duct, and a branch circuit connector adapted to be inserted through said aperture into said bus-duct and in operative relation to said bus bars, said connector comprising an insulating base having a movable switch blade mounted thereon and contact means so constructed and arranged as to resiliently contact a bus bar when said base is placed in operative relation thereto, said contact means including a contact area positioned between said bus bars and adapted frictionally to engage said switch blade when said blade is actuated, and an insulating barrier on said base disposed to lie to one side of said switch blade and between said switch blade and said bus bar.

14. In a bus-duct electrical distribution system, a branch circuit connector adapted to be inserted substantially completely within said bus-duct through an aperture therein, said connector including a base of insulation, a plurality of automatic circuit interrupting devices mounted on said base, a terminal clamping screw at one end of each of said automatic circuit interrupting devices so that the wires of a branch electrical circuit may be electrically connected to said automatic circuit interrupting devices, a movable switch blade at the other end of each of said automatic circuit interrupting devices, a plurality of pairs of electrically connected contact members also mounted on said base, one contact member of each pair of contact members being in direct resilient contact with a bus bar within said bus duct, the other contact member of each pair of contact members being out of direct contact with a bus bar and so positioned as to frictionally engage a movable switch blade when said blade is actuated, and means for mechanically connecting each movable switch blade to each other movable switch blade so that each switch blade may be moved simultaneously with each other switch blade into, or out of, contact with an associated contact member to completely electrically connect, or disconnect, the wires of a branch circuit electrically connected to said automatic circuit interrupting devices.

15. In apparatus of the character described, the combination with a duct having a plurality of spaced bus bars disposed therewithin and extending longitudinally thereof, one wall of said duct being provided with an opening, of a base member of electrical insulating material, electrical contact means connected to said base member and adapted to be inserted through said opening into said duct, said electrically contact means comprising a first contact area adapted directly to contact one of said bus bars and a second contact area adapted to be engaged by a switch blade and arranged out of direct contact with said bus bar but disposed within said duct and between planes extending substantially perpendicular to said base member and through said bus bars when said electrical contact means is inserted through said opening and into operative relation to a bus bar within said duct.

16. In apparatus of the character described, the combination with a duct having a plurality of spaced bus bars disposed therewithin and extending longitudinally thereof, one wall of said duct being provided with an opening, of a base member of electrical insulating material, electrical contact means connected to said base and adapted to be inserted through said opening into said duct, said electrical contact means comprising a first contact area adapted directly to contact one of said bus bars and a second contact area adapted to be engaged by a switch blade and arranged out of direct contact with said bus bar but disposed within said duct when said electrical contact means is inserted through said opening and into operative relation to a bus bar within said duct, and a switch blade movably mounted on said base and adapted to engage said second contact area, said blade extending generally lengthwise of said bus bars and within said duct when electrically connected to said second contact area.

17. In apparatus of the character described, the combination with a duct having a plurality of spaced bus bars disposed therewithin and extending longitudinally thereof, one wall of said duct being provided with an opening, of a base member of electrical insulating material, electrical contact means connected to said base member and adapted to be inserted through said opening into said duct, said electrical contact means comprising a first contact area adapted directly to contact a first of said bus bars and a second contact area adapted to be engaged by a switch blade and arranged out of direct contact with said bus bars but disposed within said duct and between planes extending substantially perpendicular to said base member and through said bus bars when said electrical contact means is inserted through said opening and into operative relation to a bus bar within said duct, and an insulating barrier on said base member adapted and arranged to extend between said electrical contact means and a second of said bus bars.

18. In apparatus of the character described, a bus-duct containing spaced bus runs and provided with an opening in a side thereof, a branch circuit connector including a base of electrical insulating material, a plurality of switch blades movably mounted on said base, and a plurality of spaced pairs of electrically connected contact areas connected to said base and adapted to be inserted through said opening into said duct, a first contact area of each pair of contact areas being adapted directly to contact a bus run within said bus-duct and each of the second contact areas of said pairs of contact areas being out of direct contact with a bus run and positioned, respectively, for frictional engagement by one of said movable switch blades, all of said contact areas lying within said duct when said pairs of contact areas are inserted through said opening and into operative relation to the bus bars within said duct, and means connected with said switch blades for moving them together and into or out of frictional engagement with said second contact areas whereby completely and electrically to connect or disconnect the conductors of a branch circuit with or from said second contact areas.

19. In apparatus of the character described, the combination with a duct having a plurality of spaced bus runs extending therewithin and longitudinally thereof, the walls of said duct being provided with a pair of openings therein, of a first base member of electrical insulating material, electrical contact means connected to said base and adapted to be inserted through one of said openings into said duct, said electrical contact means comprising a first contact area adapted directly to contact one of said bus bars and a second contact area adapted to be engaged by a switch blade and arranged out of direct contact with said bus runs but disposed within said duct and between planes extending substantially perpendicular to said base member and through said bus runs when said electrical contact means is inserted through said opening and into operative relation to a bus run within said duct, and a second base member of electrical insulating material provided with a switch blade adapted to be inserted through a second opening into said duct and adapted to engage said second contact area of said contact means.

20. In apparatus of the character described, the combination with a duct having a plurality of bus bars mounted in spaced relation therewithin, the walls of said duct being provided with a pair of openings therein, of a first base member of electrical insulating material, electrical contact means connected to said base and adapted to be inserted through one of said openings into said duct, said electrical contact means including electrically connected contact areas, one of said contact areas being adapted directly to contact one of said bus bars and a second of said contact areas being out of direct contact with said bus bars and positioned between said bus bars for frictional contact by a contact blade when disposed within said duct, and a second base member of electrical insulating material provided with a switch blade adapted to be inserted through a second of said openings into said duct and adapted to engage a second contact area of said contact means.

21. In apparatus of the character described, the combination with a duct having a plurality of spaced bus bars extending therewithin and longitudinally thereof, the walls of said duct being provided with an opening therein, of a base member of electrical insulating material, electrical contact means connected to said base and adapted to be inserted through said opening into said duct, said electrical contact means comprising a first contact area adapted directly to contact one of said bus bars and a second contact area adapted to engage a switch blade and arranged out of direct contact with said bus bar but disposed within said duct and between planes extending substantially perpendicular to said base member and through said bus bars when said electrical contact means is inserted through said opening and into operative relation to a bus bar within said duct, a switch blade movably mounted on said base and adapted to engage said second contact area of said contact means, means for fastening said base member on said duct, means for effecting a substantially vapor-proof connection between said base member and duct, means disposed in part exteriorly of said duct when said base member is fastened thereto for actuating said switch blade, and a flexible, vapor-proof element arranged to envelop the exteriorly disposed portion of said switch-actuating means whereby to prevent the ingress of vapor to said duct.

22. In apparatus of the character described, a bus-duct containing spaced bus runs and provided with an opening in a side thereof, a branch circuit connector adapted to be inserted through said opening and substantially completely within said bus-duct, said connector being supported on a base member of electrical insulating material and including a switch blade movably mounted on said base and a pair of electrically connected contact members connected to said base, a first contact member of said pair being adapted directly to contact a bus run within said bus-duct and the second contact member of said pair being out of direct contact with a bus run and spaced from said first contact member and positioned for frictional engagement by said movable switch blade, said base having electrical insulating means forming a lateral enclosure substantially entirely about said second contact member and said switch blade; said enclosure lying within said duct when said connector is inserted within said bus-duct and into operative relation to a bus run therewithin.

23. In a device of the character described, a duct provided with an aperture therein, a plurality of spaced bus runs supported within said duct, and a branch circuit connector adapted to be inserted through said aperture and in operative relation to said bus runs, said connector being supported on a base member of electrical insulating material and including a pair of electrically connected contact members connected to said base and a switch blade movably mounted on said base, one contact member of said pair of contact members being adapted directly to contact a bus run and the other contact member of said pair being out of direct contact with a bus run and positioned between said bus runs for frictional engagement by said switch blade; said insulating base having barrier means disposed to lie on one side of said switch blade and thereabove.

24. In a bus-duct electrical distribution system, a branch circuit connector adapted to be inserted substantially completely within said bus-duct through an aperture therein, said connector including a base of insulation, a plurality of automatic circuit interrupting devices mounted on said base, means electrically connected to one end of each of said automatic circuit interrupting devices for electrically connecting thereto the conductors of a branch electrical circuit, a plurality of movable switch blades electrically connected respectively to the other ends of said automatic circuit interrupting devices, a plurality of pairs of electrically connected contact members also mounted on said base, one contact member of each pair of contact members being in direct contact with a bus bar within said bus duct, the other contact member of each pair of contact members being out of direct contact with a bus bar and so positioned as to frictionally engage a movable switch blade when said blade is actuated, and means for mechanically connecting each movable switch blade to each other movable switch blade so that said switch blades may be simultaneously moved.

MARTIN J. DE MASK.

CERTIFICATE OF CORRECTION.

Patent No. 2,231,056.  February 11, 1941.

MARTIN J. DE MASK.

It is hereby certified that error appears in the printed specification of the above numbered patent requiring correction as follows: Page 2, first column, line 33, before "secured" insert --hingedly--; page 3 second column, line 13, for "take-up" read --take-off--; page 4, first column, line 52, strike out the word "to"; and second column, line 47, claim 1, for "insuating" read --insulating--; page 6, first column, line 71, claim 15, for "electrically" read --electrical--; and that the said Letters Patent should be read with this correction therein that the same may conform to the record of the case in the Patent Office.

Signed and sealed this 18th day of March, A. D. 1941.

(Seal)  Henry Van Arsdale,
Acting Commissioner of Patents.